July 25, 1939.  E. B. HUDSON  2,167,548
ELONGATION GAUGE AND METHOD
Filed Aug. 16, 1937  2 Sheets-Sheet 1
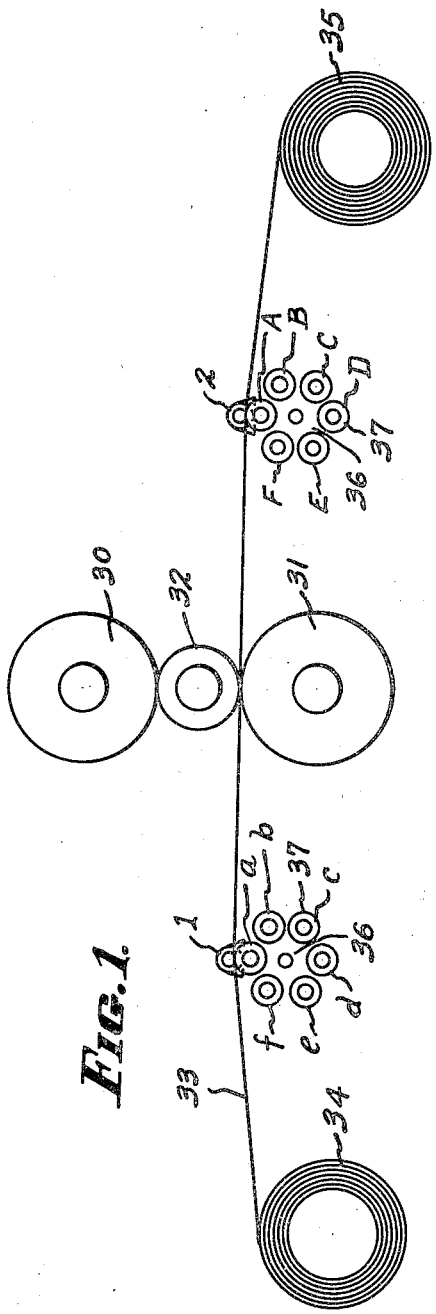
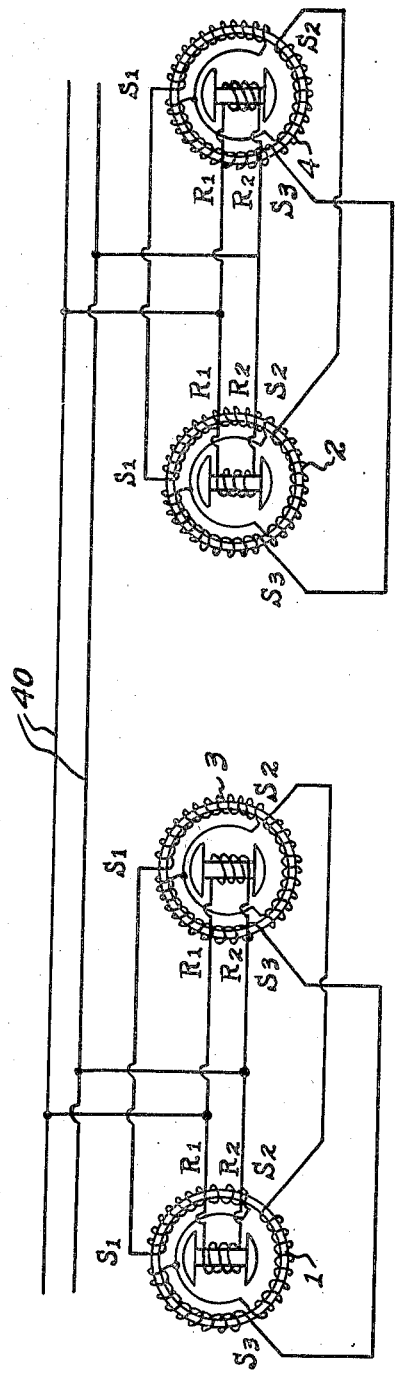
INVENTOR.
EDWIN B. HUDSON.
BY
ATTORNEYS.

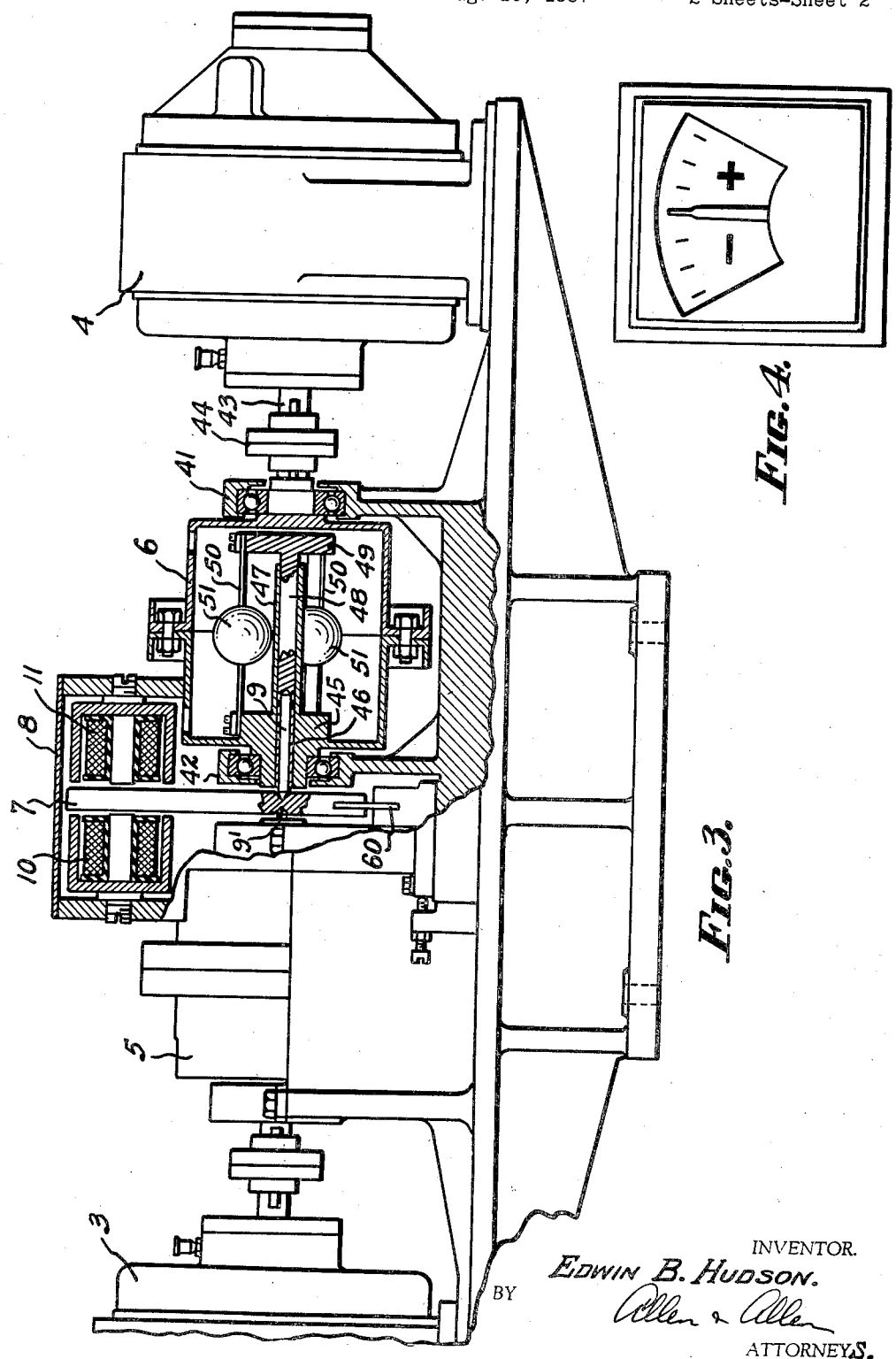

Patented July 25, 1939

2,167,548

UNITED STATES PATENT OFFICE 2,167,548

ELONGATION GAUGE AND METHOD

Edwin B. Hudson, Middletown, Ohio, assignor to The American Rolling Mill Company, Middletown, Ohio, a corporation of Ohio Application August 16, 1937, Serial No. 159,249

9 Claims. (Cl. 80—32)

This invention relates to a device for indicating the elongation in a strip over the full range of speeds while temper rolling. This invention also provides a novel method of gauging the elongation. In temper rolling, the elongations are often less than 1% and a very sensitive device is necessary in order to indicate such low elongations over the full range of mill speeds. The average tachometer is not satisfactory since it is not accurate down to 0.2%, and since elongations of 0.2% are often required, some more accurate method and instrument is necessary.

In view of the difficulties above mentioned, it is an object of my invention to provide an elongation gauge of extreme accuracy, even at elongations as low as 0.2%.

It is another object of my invention to provide a highly accurate gauge as above mentioned, which will be extremely accurate, regardless of rolling speeds and the operation of which will be entirely independent of rolling speeds so that the accuracy of the instrument will be maintained over the full range of mill speeds.

It is another object of my invention to provide a novel method of gauging elongations in accordance with which, after a certain elongation has been determined upon, it is possible to tell very accurately, whether or not that predetermined elongation is being produced.

It is a further object of my invention to provide a novel elongation gauge which will be extremely flexible in that it will provide for the measurements of elongations from 0.2% up to 2.6% or more, in steps of 0.2%.

These and other objects of my invention, I accomplish by that method and by that certain construction and arrangement of parts of which I shall now describe an exemplary embodiment. Reference is made to the drawings forming a part hereof and in which Figure 1 is a diagrammatic elevational view of a rolling mill with feeding-in and feeding-out coils, showing how my invention is applied.

Figure 2 is a wiring diagram of the data transmission apparatus.

Figure 3 is an elevational view partly in central longitudinal cross section showing the balancing mechanism.

Fig. 4 is an elevational view of the indicator.

Briefly, in the practice of my invention, I provide an elongation indicator of the under and over type, i. e. the device is set for a particular elongation as, for example, 1% and the indicator shows when the elongation is exacly 1%, and if not, whether it is above or below 1%. The mill operator watching the indicator can make minor adjustment to the mill screw to hold the elongation constant.

The principle of my invention consists in providing rotative devices adapted to be driven by the strip on the entering and exit sides of the mill and in proportioning the size of the rotative devices, so that when the elongation produced is that which was predetermined, the rotative devices will be rotated at equal speeds. The speeds of these rotative devices are impressed upon a balancing mechanism which is connected to an indicator so that when the speeds are equal (indicating that the elongation is that which was predetermined), the indicator will rest in neutral position. In order to render the device more flexible and thus capable of indicating numerous predeterminable elongations, I provide a plurality of rotative devices on each side of the mill as will now be described.

In Figure 1, I have indicated a rolling mill diagrammatically of the 3-high type, comprising large rolls 30 and 31, and an intermediate roll 32. The strip being rolled is indicated at 33, being coiled on each side of the mill as at 34 and 35. For the purpose of description of my invention, it is immaterial which is the entering and which is the exit side of the mill. Between each of the coils and the mill, I provide a spider member indicated diagrammatically at 36, which carries a plurality of rollers indicated generally at 37. The particular construction of this device forms no part of my invention and I have, therefore, merely indicated it diagrammatically. It is to be understood, of course, that means are provided whereby the member 36 may be indexed so that each one of the rollers 37 may be brought selectively into contact with the strip 33, so as to be driven thereby. I have indicated the rollers on the left hand side of the mill by the indicia $a$, $b$, $c$, $d$, $e$ and $f$, and I have indicated the rollers on the right hand side thereof by the indicia A, B, C, D, E and F. Each of the rollers is of a slightly different size than each other roller. For example, assuming that the rollers $a$ and A are those intended for use to indicate an elongation of 1% and assuming that the roller $a$ is on the entering side of the mill and has a circumference $x$, then the roller A on the exit side of the mill will have a circumference of $1.01x$. Now, since the strip on the entering side of the mill is running at unit speed and the strip on the exit side of the mill is running 1% higher than unit speed, it will be clear that the rollers $a$ and A will be rotated at equal speeds. The dimensions of the remaining rolls on each side of the mill are similarly calculated and in my preferred embodiment, I provide for elongations ranging from 0.2% to 2.6% in steps of 0.2%. A simple table will be provided for the mill operator which will indicate, for example, that for an elongation of 1%, the roller $a$ shall be used on the entrance side of the mill and the roller A on the exit side. It is to be understood, of course, that my invention is so flexible that any number of predeterminable elongations may be provided for in steps of any increment.

Means are provided which also do not form a part of my invention and are therefore not illustrated, for causing that roller on each side of the mill which is being driven by the strip to drive a data transmitter 1 and 2 respectively. These data transmitters are connected as will be described to data receivers 3 and 4 respectively, so that the rotation of the devices 1 and 2 is transmitted respectively to the devices 3 and 4.

The devices 1 and 2 are simple Selsyn transmitters and members 3 and 4 are Selsyn receivers. The connections for these devices are shown in Figure 2. The supply line is indicated at 40 and the stator leads of the transmitter and receiver on each side are connected $S_1$ to $S_1$, $S_2$ to $S_2$ and $S_3$ to $S_3$. The two rotors are connected together $R_1$ to $R_1$ and $R_2$ to $R_2$ and are excited from the supply line 40 as shown. Assuming now that both rotors, i. e. in the transmitter and receiver are free to turn, they will take such a position that the voltages induced in the two stators are of balanced magnitude and displacement. Under this condition of stator voltage balance between the transmitter and receiver, there is no circulating current in the stator windings. Now, if the rotor of one Selsyn device (the transmitter) is displaced by a certain angle and the rotor of the other (the receiver) is held in its original position, the stator voltage balance is altered and a current will flow in the windings. This circulating current reacting on the excitation flux provides a torque tending to turn the rotors of the machines to a position where the induced stator voltages are again equal and opposite. Thus with both rotors unrestrained, any motion given to the rotor of a Selsyn transmitter will be transmitted to and duplicated by the rotor of the Selsyn receiver. These devices are not a part of my invention and I have described them only to aid in a better understanding of the operation of my device. In Figure 3 I have indicated at 5 and 6, devices which I term axial thrusters. These devices are identical and I will therefore describe only the device shown in cross section. The axial thruster 6 comprises a housing mounted for rotation in bearings 41 and 42 and the housing is driven by the Selsyn receiver 4 through a shaft 43 and coupling 44. The member 6 is provided with a hub 45, having a bore 46 and a sleeve 47, through which the bore 46 extends. Within the bore 46 there is provided a plunger 48 having a large flange 49. Extending between and fastened to the hub 45 and the flange 49, respectively, are reeds 50 carrying balls 51. Also mounted within the bore 46 is the thrust pin 9. The thrust pin 9' of the member 5 may be seen in the drawings. It will now be understood that as the shaft 43 is rotated by means of the Selsyn receiver 4, the housing 6 is likewise rotated and centrifugal force causes the balls 51 to fly outwardly bowing out the reeds 50 and causing the flange 49 and plunger 48 to move toward the left. This motion is transmitted to the thrust pin 9. The thrust of the pin 9, therefore, increases with the speed of the Selsyn receiver 4 and thus also with the speed of the Selsyn transmitter 2 or the strip in contact with the roll $a$ which drives the Selsyn transmitter 2.

At 8 I have indicated an electrical gauge of known construction having an armature bar 7. This armature is mounted upon a flexible reed, as indicated at 60, and may swing toward the left or right of Fig. 3 in accordance with the balance of thrusts exerted thereon by the pins 9 and 9'. The armature bar 7 is adapted to move between the coils 10 and 11 of the gauge 8 which is connected in conventional manner to a pointer of the type shown in Figure 4.

It will now be clear that if a certain elongation has been decided upon and appropriate rollers have been positioned on the entering and exit sides of the mill, so that when the proper elongation is being produced, the rollers on the entering and exit sides of the mill are rotating at equal speeds, which speeds are transmitted to the axial thrusters 5 and 6, the thrust of the pins 9 and 9' will be equal, and the armature bar 7 will be maintained in a neutral position, and, of course, the pointer on the indicator will likewise remain in neutral position. As soon as the strip is elongated more or less than the predetermined percentage, there will be a change in the relative speeds of the rolls on the entering and exit sides of the mill respectively, and this disturbed relation will be transmitted through the mechanisms to the thrust pins 9 and 9' and the armature 7 will be caused to swing in one direction or another. This swing is transmitted in conventional manner and amplified from the mechanisms to the pointer of the indicator shown in Figure 4.

It will be seen from the above description that this method and device is advantageous in that the elongation is indicated independently of the speed of the mill. Altough the thrust on the pins 9 and 9' at low mill speeds will obviously be less than it will at high mill speeds, the indicator is affected only by the balance of the forces and not by magnitude. With this arrangement mill speeds have no effect upon the indication of elongation, whereas with any tachometer arrangement mill speed variation will upset the system. Any difference in the forces exerted by the pins 9 and 9', however small, will cause the armature 7 to move and this motion will be amplified in any conventional manner and be visible on the indicator. The indicator needle will not hunt from plus to minus at a rapid rate, because the change in thrust on the pins 9 and 9' is gradual. The reason for this is that the balls 51 may be considered as a fly wheel and it is well known that a fly wheel cannot change speed instantly but only gradually.

It is to be understood that modifications may be made in my invention without departing from the spirit thereof and that dimensions and figures given herein are exemplary only.

Having thus described my invention what I claim as new and desire to secure by Letters Patent is:

1. The method of determining the adherence of a mill to a predetermined per cent elongation, which includes the steps of contacting the strip at the entrance and exit sides of the mill, respectively, with rotative elements, and proportioning the sizes of said elements in such manner that when the predetermined elongation is being produced, said elements will be rotated at the same speed.

2. The method of determining the adherence of a mill to a predetermined elongation program, which includes the step of contacting the strip at the entrance and exit sides of the mill, respectively, with rotative elements of such proportions that they will rotate at equal speeds when said predetermined elongation is being produced.

3. An elongation gauge for rolling mills, comprising members adapted to be driven by contact thereof with the strip on the entering and exit sides respectively, the sizes of said members being so proportioned that, when the elongation is as predetermined, said members will be rotated at the same speed.

4. An elongation gauge for rolling mills, comprising members adapted to be driven by contact thereof with the strip on the entering and exit sides respectively, the sizes of said members being so proportioned that, when the elongation is as predetermined, said members will be rotated at the same speed, and means for indicating the relation of said speeds.

5. An elongation gauge for rolling mills, comprising a plurality of members on the entrance and exit sides of a mill, selectively positionable to be driven by contact thereof with the strip, the sizes of said members being so proportioned that at various predetermined elongations, various pairs of said members, respectively on the entrance and exit sides of the mill, will be driven at equal speeds.

6. An elongation gauge for rolling mills, comprising a plurality of members on the entrance and exit sides of a mill, selectively positionable to be driven by contact thereof with the strip, the sizes of said members being so proportioned that at various predetermined elongations, various pairs of said members, respectively on the entrance and exit sides of the mill, will be driven at equal speeds, and means for indicating the relation of said speeds.

7. In an elongation gauge for rolling mills, means for converting the linear motion of the strip on the entrance and exit sides of the mill respectively, at a predetermined elongation, into equal rotary motions, and balancing means operative in response to axial thrusts produced by said rotary motions to indicate the relation of said motions.

8. In an elongation gauge for rolling mills, a balancing mechanism comprising an armature pivoted between thrust members, said thrust members being driven in opposite directions by the strip on the entrance and exit sides of the mill, respectively, and said thrust members being driven at equal speeds when the elongation is as predetermined, and means in said drives for increasing the axial thrust of said members upon an increase in speed of the stock on the entrance or exit sides of the mill, respectively.

9. In an elongation gauge for rolling mills, a balancing mechanism comprising an armature pivoted between thrust members, said thrust members being driven in opposite directions by the strip on the entrance and exit sides of the mill, respectively, and said thrust members being driven at equal speeds when the elongation is as predetermined, and means in said drives for increasing the thrust of said members upon an increase in speed of the stock on the entrance or exit sides of the mill, respectively, and means for amplifying and indicating the effect of said thrusts on said armature.

EDWIN B. HUDSON.